(12) United States Patent
Thompson et al.

(10) Patent No.: US 12,552,257 B2
(45) Date of Patent: Feb. 17, 2026

(54) BATTERY SWAPPING CONTROL SYSTEM FOR MOBILE ELECTRIC MACHINE

(71) Applicant: Caterpillar Inc., Peoria, IL (US)

(72) Inventors: Brodie Lee Thompson, Tasmania (AU); Jason Prakash Wigg, Ridgley (AU); Alexander Eli Dowling, Mount Hicks (AU); Jonathan M. Baumann, Hanna City, IL (US); Andrew Diecker, Shorewell Park (AU)

(73) Assignee: Caterpillar Inc., Peoria, IL (US)

( * ) Notice: Subject to any disclaimer, the term of this patent is extended or adjusted under 35 U.S.C. 154(b) by 118 days.

(21) Appl. No.: 18/658,119

(22) Filed: May 8, 2024

(65) Prior Publication Data

US 2025/0128605 A1    Apr. 24, 2025

Related U.S. Application Data

(60) Provisional application No. 63/591,829, filed on Oct. 20, 2023.

(51) Int. Cl.
*B60L 3/00* (2019.01)
*B60L 53/80* (2019.01)
*H02J 9/06* (2006.01)

(52) U.S. Cl.
CPC ............ *B60L 3/0092* (2013.01); *B60L 53/80* (2019.02); *H02J 9/06* (2013.01); *B60L 2200/40* (2013.01)

(58) Field of Classification Search
CPC .......... B60L 3/0092; B60L 53/80; H02J 9/06; B06L 2200/40
USPC .......................................................... 307/64
See application file for complete search history.

(56) References Cited

U.S. PATENT DOCUMENTS

| | | | |
|---|---|---|---|
| 2025/0042447 A1* | 2/2025 | Matsushima | ........ B61D 19/026 |
| 2025/0121684 A1* | 4/2025 | Boyd | .................... B60L 3/0023 |

FOREIGN PATENT DOCUMENTS

| | | |
|---|---|---|
| CN | 203821181 | 9/2014 |
| CN | 214090095 | 8/2021 |
| JP | 2018164440 | 10/2018 |
| JP | 6622243 | 11/2019 |
| JP | 2020166881 | 10/2020 |
| JP | 2021071093 | 5/2021 |
| WO | 2022166950 | 8/2022 |

* cited by examiner

Primary Examiner — Michael R. Fin

(57) ABSTRACT

A configuration of emergency stop (E-Stop) and high voltage interface lock (HVIL) circuit hardware and software is described that, alone or in combination, allows mobile electric machines with removable power units to function properly when the unit is removed, such as during battery swapping.

15 Claims, 4 Drawing Sheets

BATTERY SWAPPING CONTROL SYSTEM FOR MOBILE ELECTRIC MACHINE

CLAIM OF PRIORITY

This application claims the benefit of U.S. Provisional Patent Application Ser. No. 63/591,829, filed on Oct. 20, 2023, the benefit of priority of which is claimed hereby, and which is incorporated by reference herein in its entirety.

TECHNICAL FIELD

This disclosure relates generally to electric vehicles and, more particularly to battery swapping techniques.

BACKGROUND

Emergency stop (E-stop) systems are a critical safety feature in industrial machinery and mobile equipment. When an E-stop button is pressed, the system acts to immediately halt any dangerous operation and remove power to actuators. This helps prevent injury to operators and damage to equipment.

E-stop systems typically have redundant wiring that forms a closed circuit. If the circuit is broken, such as by pressing the E-stop button, it triggers rapid shutdown of machinery. The circuits are also monitored for faults like open circuits or shorts which could compromise safety.

Standards organizations like ISO and ANSI provide specifications for e-stop systems. Some key requirements are that E-stop buttons must be highly visible, readily accessible to operators, and take priority over all other functions. The buttons are often colored red for quick identification.

When an E-stop is triggered, brakes and other measures engage to bring motion to a stop as quickly as possible. Power to actuators is removed using contactors or relays. The system then remains in a "latched" condition until manually reset to avoid restarting until any issues are cleared.

SUMMARY

This disclosure is directed to a configuration of emergency stop (E-Stop) and high voltage interface lock (HVIL) circuit hardware and software that, alone or in combination, allows mobile electric machines with removable power units to function properly when the unit is removed, such as during battery swapping.

In some aspects, this disclosure is directed to a high-voltage interface lock (HVIL) control system for a mobile electric machine having a removable power unit (RPU), the HVIL control system comprising: at least one emergency stop switch having a run state and a stop state, the at least one emergency stop switch configured to be coupled with a first voltage from a first voltage supply; a master switch relay electrically coupled in series with the at least one emergency stop switch and configured to receive the first voltage when the at least one emergency stop switch is in the run state, the master switch relay configured to be electrically coupled with and provide the first voltage to an RPU HVIL relay when the RPU is engaged with the mobile electric machine; a machine HVIL relay electrically coupled with the master switch relay and with the RPU HVIL relay; and a secondary power source relay electrically coupled with the machine HVIL relay, wherein when the RPU is not engaged with the mobile electric machine and when the at least one emergency stop switch is in the run state: the machine HVIL relay is configured to: receive, via the master switch relay, the first voltage; and the secondary power source relay is configured to: receive, via the master switch relay, the first voltage and allow a secondary power source to supply power to the mobile electric machine.

In some aspects, this disclosure is directed to high-voltage interface lock (HVIL) control system for a mobile electric machine having a removable power unit (RPU), the HVIL control system comprising: at least one emergency stop switch having a run state and a stop state; a first relay electrically coupled in series with the at least one emergency stop switch; a master electronic control module in electrical communication with the first relay, the master electronic control module including a controller; a first interface electronic control module in electrical communication with the master electronic control module; and a second relay in electrical communication with first interface electronic control module and the first relay, wherein the controller of the master electronic control module is configured to: monitor the run state and the stop state of the at least one emergency stop switch; monitor a battery swap switch; and when the at least one emergency stop switch is in the run state and when the battery swap switch is engaged: output a signal to the first interface electronic control module to energize the second relay to allow a secondary power source to supply power to the mobile electric machine.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized that when a removable power unit (RPU) is detached from a mobile electric machine, it results in an open circuit fault in the E-Stop system. The open circuit fault triggers an E-Stop condition that neutralizes the machine by disabling propulsion, steering, implements, etc. and engaging the parking brake. The electric machine can no longer move toward a new charged removable power unit.

The present inventors have recognized a need for a new battery swapping control system for an electric machine. This disclosure describes a configuration of emergency stop (E-Stop) and high voltage interface lock (HVIL) circuit hardware and software that, alone or in combination, allows mobile electric machines with removable power units to function properly when the unit is removed, such as during battery swapping.

As described in detail below, in some examples, a series of electronically controlled relays arranged in a specific way and are added to the E-Stop and HVIL circuits. The relays allow the circuits to be "redirected" before removing the power module. This keeps the safety circuits intact and functional.

The relays are actuated by electronic control modules (ECM) in a precise sequence. This prepares the E-Stop and HVIL circuits prior to removing the power module. Once the relays are in the correct state, the removable power unit can be detached without falsely triggering emergency stop or HVIL.

The redesigned circuit maintains required safety and performance levels. When the power module is removed, the onboard E-Stop and HVIL systems on the machine still fully operate, which allows safe battery swapping while retaining emergency stop functionality.

Figure 1:
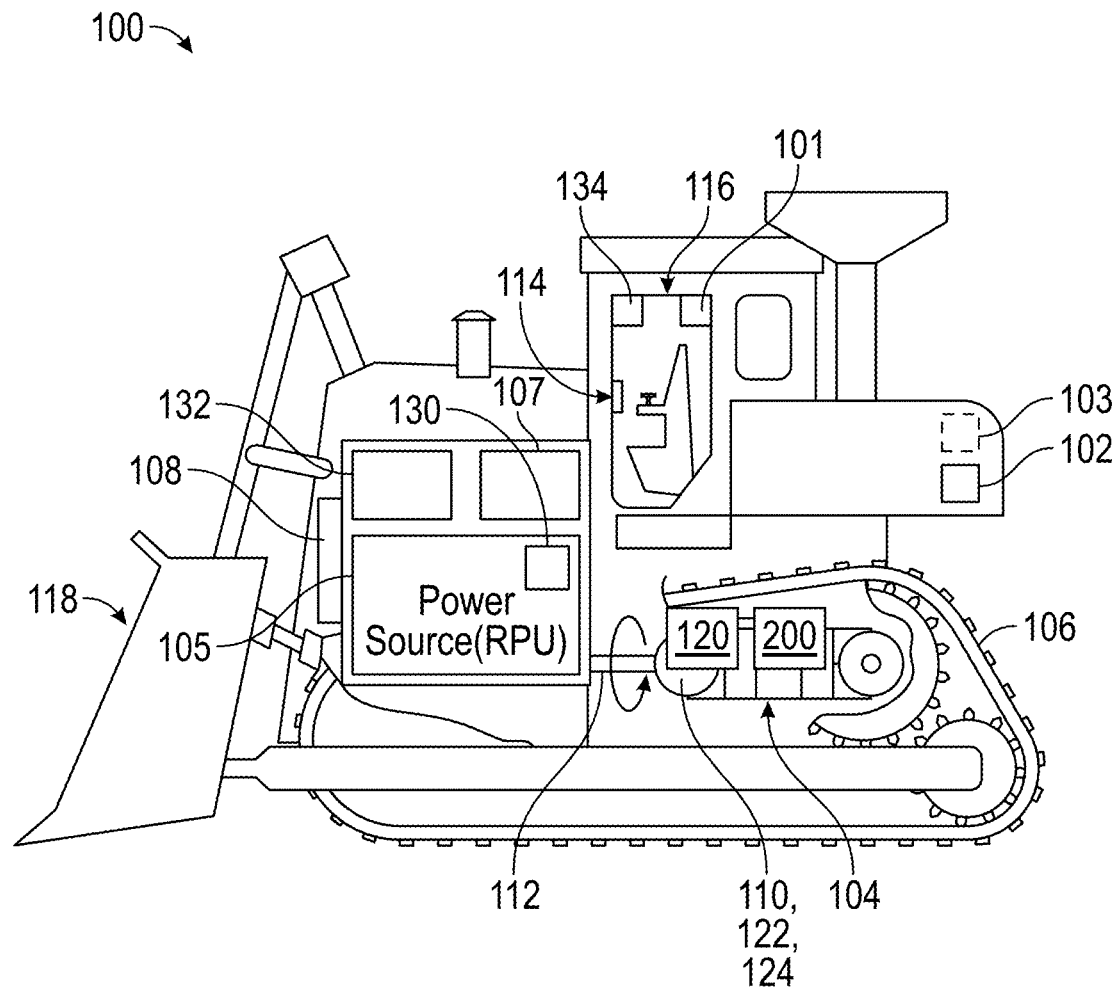
FIG. 1 depicts an example of a mobile electric machine that includes a removable power unit.

FIG. 1 depicts an example of a mobile electric machine 100 that includes a removable power unit. The mobile electric machine 100 is shown as a track type tractor but can include any type of machine that includes a synchronous machine.

As shown, the mobile electric machine 100 can have a power source 105, an electric drive system 104, a traction system 106, an inverter circuit 108, a synchronous machine 110, and a drive shaft 112. The power source 105 is configured to supply power to the mobile electric machine 100. In some implementations, the power source 105 can be a direct current (DC) power source, such as a fuel cell. Examples of fuel cells include lithium-ion batteries or other rechargeable batteries having one or more battery cells, and one or more capacitors, e.g., ultra capacitors. In some examples, the power source (RPU) 105 includes at least one battery pack 130 having one or more rechargeable battery cells.

The power source 105 is a removable power unit (RPU). When an operator presses a battery swap switch 134, such as located in the operator station 116 or cab 116, the power source (RPU) 105 can be dropped from the mobile electric machine 100 and a charged replacement power source (RPU) 105 can be attached, thereby eliminating the need to have the mobile electric machine 100 waiting while the power source (RPU) 105 is charging in place. In some examples, however, the power source (RPU) 105 can be charged while still engaged with the mobile electric machine 100. The mobile electric machine 100 can further include a secondary power source 132 to provide power to the mobile electric machine 100 in the event that the power source 105 is not present or discharged, for example.

The power source 105 can be operably arranged to receive control signals from operator controls 114 in the operator station 116. Additionally, the power source 105 can be operably arranged with the electric drive system 104 and/or an implement 118 to selectively operate the electric drive system 104 and/or the implement 118 according to control signals received from the operator controls 114. The power source 105 can provide operating power for the propulsion of the electric drive system 104 and/or the operation of the implement 118 via, for example, the electric drive system 104, the inverter circuit 108, the synchronous machine 110, the drive shaft 112, and/or the like.

The electric drive system 104 can be operably arranged with the power source 105 to selectively propel the mobile electric machine 100 via control signals from the operator controls 114. The electric drive system 104 can be operably connected to a plurality of ground-engaging members, such as traction system 106, as shown, which can be movably connected to the mobile electric machine 100 through axles, drive shafts, a transmission, and/or other components and which can be movably connected to the electric drive system 104 via the synchronous machine 110 and the drive shaft 112. In some implementations, the traction system 106 can be provided in the form of a track-drive system, a wheel-drive system, or any other type of drive system configured to propel the mobile electric machine 100. In some implementations, the electric drive system 104 can be operably arranged with power source 105 to selectively operate the implement 118, which can be movably connected to the mobile electric machine 100 and to the electric drive system 104. The traction system 106 can be mechanically coupled with the synchronous machine 110.

The inverter circuit 108 can be electrically connected to the power source 105 and/or the electric drive system 104. In some implementations, the inverter circuit 108 can receive a DC current from the power source 105 and can control a phase of the DC current to provide an AC current to the synchronous machine 110. Additionally, or alternatively, the inverter circuit 108 can provide the AC current to a generator. In this way, the inverter circuit 108 can provide operating power for the propulsion of the mobile electric machine 100 and/or the operation of the implement 118.

The synchronous machine 110 can be electrically coupled to a sensor 120, which can provide feedback to a control system to enable control of the inverter circuit 108, the synchronous machine 110, and/or the like. For example, the sensor 120 can be a current sensor that provides information identifying a set of currents associated with a set of phases of current provided from the inverter circuit 108 to the synchronous machine 110. The synchronous machine 110 can include a rotor 122 and a stator 124. Based on the sensor 120 providing feedback to the control system, the control system can determine an estimated angular position (e.g., a relative position) of the rotor 122 and the stator 124 to enable the control system to control the inverter circuit 108, the synchronous machine 110, and/or the like.

The implement 118 can be operably arranged with the electric drive system 104 such that the implement 118 is selectively movable through control signals transmitted from the operator controls 114 to the electric drive system 104, the inverter circuit 108, the synchronous machine 110, the drive shaft 112, and/or the like. The illustrated implement 118 is a tractor loader. Other embodiments can include any other suitable implement for a variety of tasks, such as, for example, dozing, blading, brushing, compacting, grading, lifting, ripping, plowing, and/or the like. Example implements include dozers, augers, buckets, breakers/hammers, brushes, compactors, cutters, forked lifting devices, grader bits and end bits, grapples, and/or the like.

For emergencies, the mobile electric machine 100 can include one or more emergency stop switches. For example, the mobile electric machine 100 can include an emergency stop switch 101 located in the operator station 116 (or cab 116). In other examples, the mobile electric machine 100 can include additional emergency stop switches, such as an emergency stop switch 102 and/or an emergency stop switch 103. In some examples, the emergency stop switch 102 can be located on a left rear of the mobile electric machine 100 and the emergency stop switch 103 can be located on a right rear of the mobile electric machine 100. In other examples, one or both of the emergency stop switch 102 and the emergency stop switch 103 can be positioned toward the front of the mobile electric machine 100.

Each emergency stop switch has a run state and a stop state. During an emergency, an operator can press an emergency stop switch and the mobile electric machine 100 immediately stops, which includes neutralizing the powertrain, disabling the implement 118 and steering, engaging a park brake, and disconnecting the secondary power source 132.

With existing control scheme approaches, when the power source (RPU) 105 is dropped from the mobile electric machine 100, the mobile electric machine 100 is placed in a state similar to that when an emergency stop switch is pressed, e.g., a stop state or emergency state, which includes immobilizing the machine. When there is no emergency, such immobilization is undesirable for a number of reasons, including that it prevents the mobile electric machine 100 from moving toward a replacement power source (RPU) 105.

Using the techniques of this disclosure, the present inventors have developed a control scheme that can be implemented by a control system 107 such that after the power source (RPU) 105 is dropped from the mobile electric machine 100 and as long as none of the emergency stop switches ("e-stops") have been pressed (the one or more e-stops are each in a run state), the mobile electric machine 100 can receive power from the secondary power source 132, thereby allowing the mobile electric machine 100 to move toward a replacement power source (RPU) 105, e.g., remaining in a run state or normal state. In this manner, the techniques of this disclosure prevent the unnecessary immobilization of the mobile electric machine 100 during a battery swap procedure.

In some examples, the techniques of this disclosure can be implemented by the synchronous machine 110 of FIG. 1.

Figure 2:
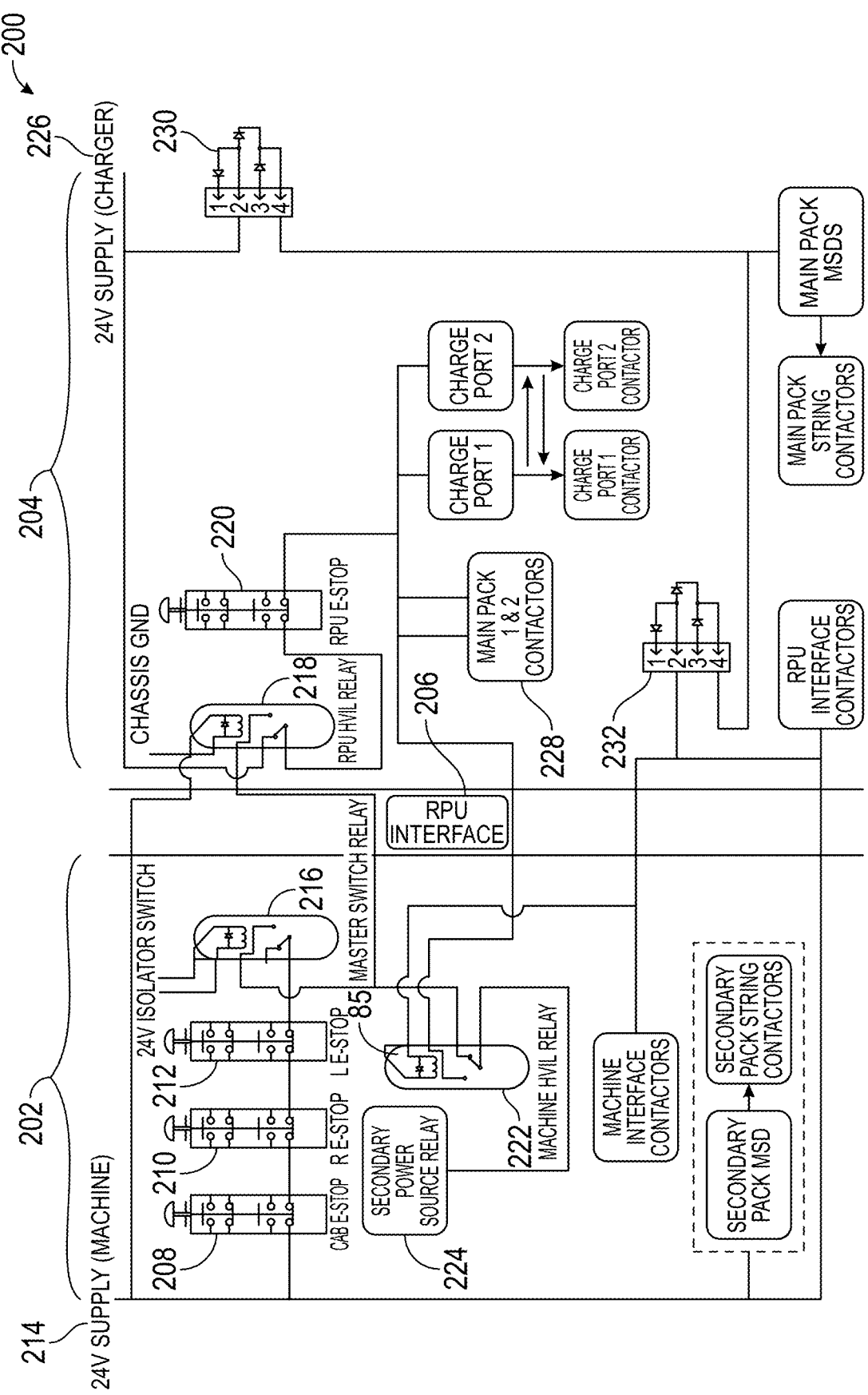
FIG. 2 depicts an example of a high-voltage interface lock (HVIL) control system for a mobile electric machine having a removable power unit.

FIG. 2 depicts an example of a high-voltage interface lock (HVIL) control system for a mobile electric machine having a removable power unit (RPU). The HVIL control system 200 can be implemented using the control system 107 of the mobile electric machine 100 of FIG. 1, for example. The control system 200 includes a machine section 202 that forms part of the mobile electric machine, such as the mobile electric machine 100 of FIG. 1, and an RPU section 204, which forms part of the power source (RPU), such as the power source (RPU) 105 of FIG. 1. The machine section 202 and the RPU section 204 are electrically coupled via an RPU interface 206.

The machine section 202 includes one or more emergency stop switches electrically coupled in series. For example, the machine section 202 includes a cab emergency stop switch 208, which is similar to the emergency stop switch 101 of FIG. 1. In the example shown, the machine section 202 includes more than one emergency stop switch, including a right emergency stop switch 210 and a left emergency stop switch 212, which can be similar to the emergency stop switch 103 and the emergency stop switch 102 of FIG. 1.

Each emergency stop switch has a run state and a stop state. If any one of the emergency stop switches is pressed, the emergency stop switch is placed in its stop state and the control system 200 immediately stops, which includes neutralizing the powertrain, disabling the implement and steering, engaging a park brake, and disconnecting the secondary power source. During normal operation, the emergency stop switches are each in their run state.

The machine section 202 includes a first voltage supply 214, e.g., a 24 volt machine voltage supply. A first voltage, e.g., 24V, from the first voltage supply 214 is coupled with the emergency stop switch. In the example shown, the first voltage is coupled with the cab emergency stop switch 208. In the example shown, the emergency stop switches each have four contacts (2 normally open and 2 normally closed) and the first voltage is coupled with a corresponding contact that is closed during the run state of the emergency stop switch. When in their depicted run states, the emergency stop switches 208-212 allow a master switch relay 216 that is electrically coupled in series with emergency stop switches to receive the first voltage and energize a relay coil of the master switch relay 216.

The RPU section 204 includes an RPU HVIL relay 218 electrically coupled in series with an RPU emergency stop switch 220. The RPU emergency stop switch 220 is similar in design to the emergency stop switches 208-212, including having a run state and a stop state. The master switch relay 216 is configured to be electrically coupled with and provide the first voltage to the RPU HVIL relay 218 when the power source (RPU) 105 is engaged with the mobile electric machine 100.

The machine section 202 further includes a machine HVIL relay 222 that is electrically coupled with the master switch relay 216 and with the RPU HVIL relay 218. The machine HVIL relay 222 is coupled with a secondary power source relay 224 that, when operated, is configured to electrically couple the secondary power source 132 of FIG. 1 to the mobile electric machine 100.

When the power source (RPU) is not engaged with the mobile electric machine and when each of the one or more emergency stop switches of the machine section 202 are in their corresponding run state (indicating that there is no emergency and that the mobile electric machine is in a normal state), the machine HVIL relay 222 is configured to receive, via the master switch relay 216, the first voltage. The secondary power source relay 224 is configured to receive, via the master switch relay and, in particular the 222, the first voltage and allow a secondary power source, such as the secondary power source 132 of FIG. 1, to supply power to the mobile electric machine.

When the power source (RPU) is not engaged with the mobile electric machine and when any one of the emergency stop switches of the machine section 202 is in a stop state (indicating there is in an emergency and the machine should be immobilized), one of the normally closed contacts of the emergency stop switch will open and prevent the master switch relay 216 from receiving the first voltage, which, in turn, will prevent the machine HVIL relay 222 from supplying the first voltage to the secondary power source relay 224.

When the power source (RPU) is engaged with the mobile electric machine, the machine HVIL relay 222 is configured to receive, via the RPU HVIL relay 218, the first voltage when 1) the RPU emergency stop switch 220 is the run state, and 2) the one or more emergency stop switches 208-212 are in their corresponding run state. The machine HVIL relay 222 then supplies the first voltage to the secondary power source relay 224 to allow the secondary power source to supply power to the mobile electric machine. The primary power source is also able to supply power to the machine under this scenario.

By using this control scheme, the master switch relay 216 and the machine HVIL relay 222 allow the mobile electric machine, such the mobile electric machine 100 of FIG. 1, to continue to operate in a normal state, e.g., not immobilized, when the emergency stop switch(es) are each in a run state.

In some examples, the mobile electric machine can charge the RPU while it is engaged with the mobile electric machine. For example, when the power source (RPU) 105 is engaged with the mobile electric machine 100 of FIG. 1, when the one or more emergency stop switches of the machine section 202 are each in their corresponding run state, and when the RPU emergency stop switch 220 of the RPU section 204 is the run state, the RPU HVIL relay 218 is configured to receive a second voltage from a second voltage supply 226 and allow charging of at least one battery pack of the power source (RPU) 105. For example, the RPU HVIL relay 218 can be configured to receive 24 volts from a charger and supply that voltage to main pack contactors 228 that are electrically coupled with the battery pack 130 of the power source (RPU) 105 of FIG. 1, thereby allowing the battery pack 130 to be recharged while engaged to the mobile electric machine 100. It should be noted that although the second voltage supply 226 is shown as being supplied from the RPU side, in other examples, the second voltage supply 226 can be supplied from the machine side.

In some examples, the HVIL control system 200 includes at least one diode connected so as to prevent coupling between the first voltage supply and the second voltage supply. For example, the RPU section 204 includes one or more diodes 230 and/or one or more diodes 232 to prevent coupling the first voltage supply 214 and the second voltage supply 226.

Figure 3:
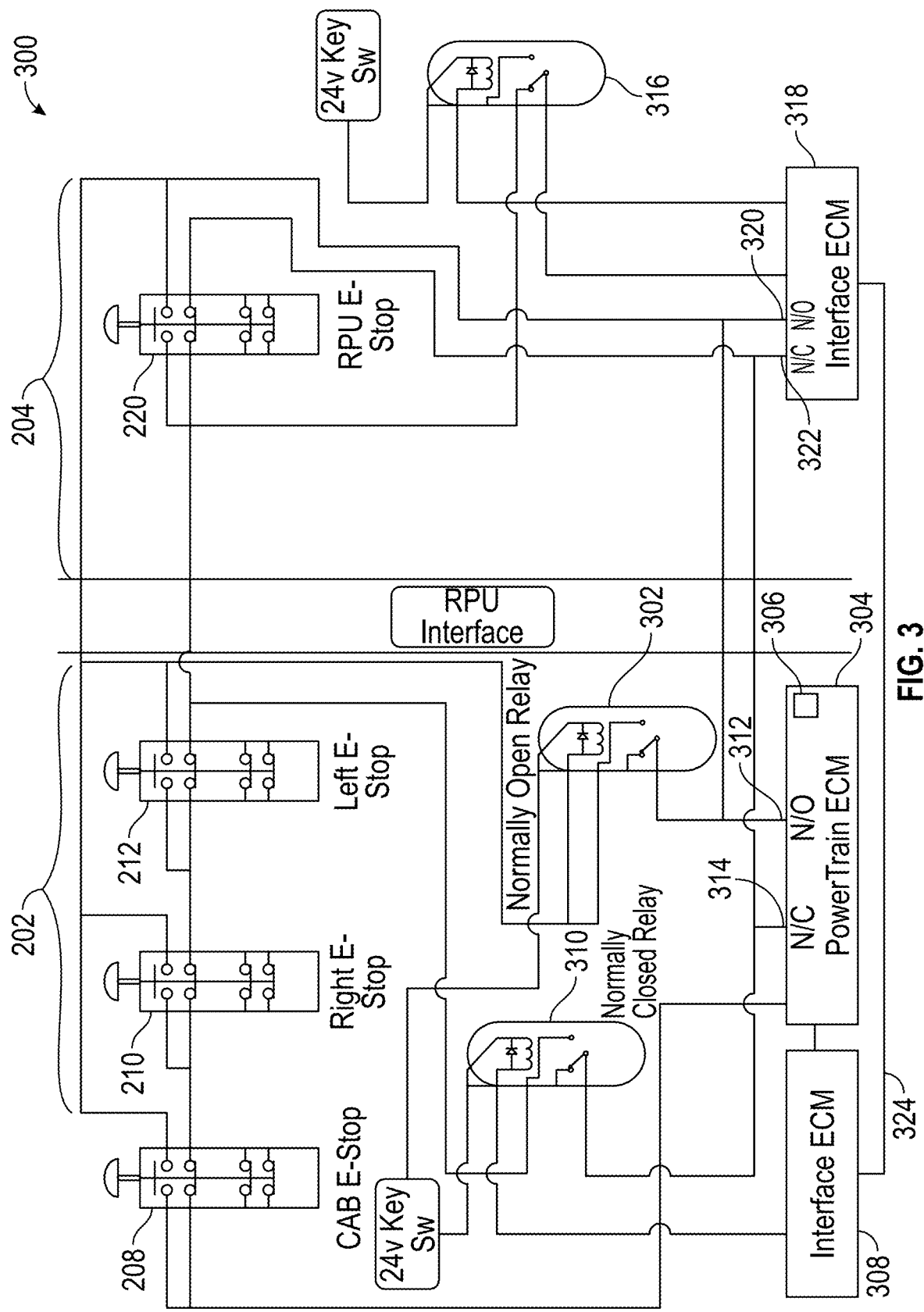
FIG. 3 depicts another example of a high-voltage interface lock (HVIL) control system for a mobile electric machine having a removable power unit.

FIG. 3 depicts another example of a high-voltage interface lock (HVIL) control system for a mobile electric machine having a removable power unit (RPU). The HVIL control system 300 can be implemented using the control system 107 of the mobile electric machine 100 of FIG. 1, for example. In some examples, the techniques of FIG. 3 can be combined with the techniques of FIG. 2. In other examples, the techniques of FIG. 2 and FIG. 3 can be used separately.

The HVIL control system 300 can be implemented alone or in combination with the HVIL control system 200 of FIG. 2. For example, the two HVIL control systems can serve as backups to one another to help ensure safe operation. As seen in FIG. 3, the control system 300 can include the machine section 202 and the RPU section 204 of FIG. 2, which includes one or more of the cab emergency stop switch 208, the right emergency stop switch 210, and the left emergency stop switch 212 in the machine section 202 and the RPU emergency stop switch 220 in the RPU section 204. Each of the emergency stop switches have a run state and a stop state, as described above.

As mentioned above, the emergency stop switches shown in FIGS. 2 and 3 include four contacts. The techniques of FIG. 2 can use two of the four contacts (the bottom two contacts shown in FIG. 3, such as arranged in a parity configuration with one open and one closed) and the techniques in FIG. 3 can use the other two contacts (the top two contacts shown in FIG. 3, such as arranged in a parity configuration with one open and one closed).

The control system 300 includes a first relay 302 electrically coupled in series with the one or more emergency stop switches, e.g., the cab emergency stop switch 208, the right emergency stop switch 210, and/or the left emergency stop switch 212. The first relay 302 includes a relay coil and a normally open contact.

The controller 306 of the master electronic control module 304 is configured to monitor the state of the contacts for each of the emergency stop switches. The controller 306 (and, in some examples, a state machine) is expecting a normally open and normally closed condition for the two contacts at all times, which is the run state. A stop state occurs when the controller 306 receives a closed contact and an open contact, which is the opposite of the run state. Both contacts closed or both contacts open are also considered to be emergency stop conditions.

The control system 300 includes a master electronic control module 304, e.g., a powertrain electronic control module (ECM), in electrical communication with the first relay 302. The master electronic control module 304 includes a controller 306, such as including a state machine. The master electronic control module 304 is coupled to the one or more emergency stop switches using a ground wire, for example, such as a digital ground or other shielded signal. A signal from the master electronic control module 304 passes through all of the emergency stop switches in series such that the master electronic control module 304 can monitor the run state and the stop state of the emergency stop switches, which are connected in series with the first relay 302.

If any of the emergency stop switches are in a corresponding stop state, the first relay 302 is energized (de-energized is the normal run state), which the controller 306 of the master electronic control module 304 will detect via the normally open input 312. The master electronic control module 304 also monitors the state of a battery swap switch, such as the battery swap switch 134 of FIG. 1.

The control system 300 further includes a first interface electronic control module 308 in electrical communication with the master electronic control module. When an operator engages, e.g., presses, a battery swap switch, such as the battery swap switch 134 of FIG. 1, and when the emergency stop switches are in their corresponding run states, the master electronic control module 304 can output a signal to the first interface electronic control module 308. In response, the first interface electronic control module 308 can output a signal to energize a second relay 310 in electrical communication with first interface electronic control module 308 and the first relay 302. The second relay 310 includes a relay coil and a normally closed contact. Energizing the second relay 310 allows a secondary power source to supply power to the mobile electric machine, such as the secondary power source 132 of the mobile electric machine 100 of FIG. 1. The master electronic control module 304 and, in particular, the controller 306 can monitor the status of the normally open first relay 302 and the normally closed second relay 310 using the normally open input 312 and the normally closed input 314.

The RPU section 204 includes a third relay 316 in electrical communication with both the RPU emergency stop switch 220 and a second interface electronic control module 318. The second interface electronic control module 318 can monitor the status of the RPU emergency stop switch 220 and, in particular, the state of a normally open contact using a normally open input 320 and the state of a normally closed contact using a normally closed input 322. The second interface electronic control module 318 is in electrically communication with the first interface electronic control module 308 via a bus 324, such as a control area network (CAN) bus.

When the RPU is engaged with the mobile electric machine, such as the power source (RPU) 105 of the mobile electric machine 100 of FIG. 1, the master electronic control module 304 is configured to be in electrical communication with the second interface electronic control module 318 of the RPU, such as via the first interface electronic control module 308. When the RPU emergency stop switch 220 is in the run state, the second interface electronic control module 318 is configured to output a first signal to the first interface electronic control module 308 so as to cause the first interface electronic control module 308 to output a second signal to de-energize the second relay 310 and place the mobile electric machine in a normal state. By de-energizing the second relay 310, the secondary power source is disconnected, and the mobile electric machine is ready to operate using power from the RPU, e.g., the power source (RPU) 105 of FIG. 1.

In some examples, the techniques of FIG. 3 can be combined with the techniques of FIG. 2, such as to provide a safety redundancy. In other examples, the techniques of FIG. 2 and FIG. 3 can be used separately.

Figure 4:
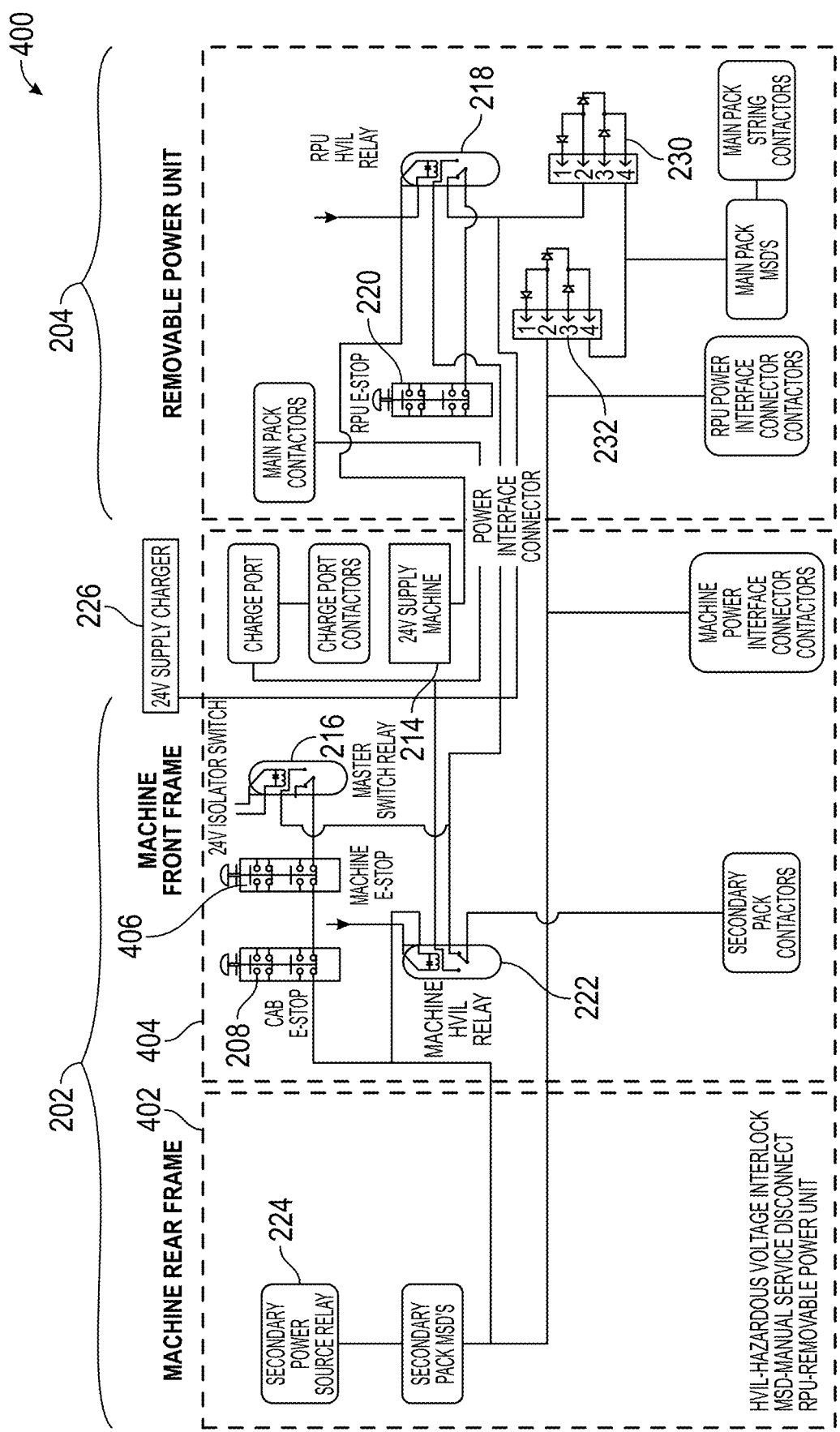
FIG. 4 depicts another example of a high-voltage interface lock (HVIL) control system for a mobile electric machine having a removable power unit (RPU).

FIG. 4 depicts another example of a high-voltage interface lock (HVIL) control system for a mobile electric machine having a removable power unit (RPU). The HVIL control system 400 can be implemented using the control system 107 of the mobile electric machine 100 of FIG. 1, for example. The control system 400 can include a machine section 202 and an RPU section 204. The machine section 202 can include a machine rear frame section 402 and a machine front frame section 404.

Like in FIG. 2 and FIG. 3, the control system 400 in FIG. 4 includes one or more emergency stop switches, such as a cab emergency stop switch 208 and/or a machine emergency stop switch 406 in the machine front frame section 404, and an RPU emergency stop switch 220 in the RPU section 204. Each of the emergency stop switches have a run state and a stop state, as described above.

In the example shown, the emergency stop switches each have four contacts (2 normally open and 2 normally closed) and the first voltage is coupled with a corresponding contact that is closed during the run state of the emergency stop switch. When in their depicted run states, the emergency stop switches 208 and 406 allow a master switch relay 216 that is electrically coupled in series with emergency stop switches to receive a first voltage and a first voltage supply 214, e.g., a 24V supply from the machine, and energize a relay coil of the master switch relay 216. It should be noted that although 24V supplies are shown and described, other configurations can include supply voltages that are higher or lower than 24V.

The RPU section 204 includes an RPU HVIL relay 218 electrically coupled in series with an RPU emergency stop switch 220. The RPU emergency stop switch 220 is similar in design to the emergency stop switches 208 and 406, including having a run state and a stop state. The RPU HVIL relay 218 is configured to receive the first voltage and be electrically coupled with the master switch relay 216 when the power source (RPU) 105 is engaged with the mobile electric machine 100.

The machine section 202 further includes a machine HVIL relay 222 that is electrically coupled with the master switch relay 216 and with the RPU HVIL relay 218. The machine HVIL relay 222 is coupled with a secondary power source relay 224 in the machine rear frame section 402 and, when operated, the machine HVIL relay 222 is configured to electrically couple the secondary power source 132 of FIG. 1 to the mobile electric machine 100.

When the power source (RPU) is not engaged with the mobile electric machine and when each of the one or more emergency stop switches of the machine section 202 is in their corresponding run state (indicating that there is no emergency and that the mobile electric machine is in a normal state), the machine HVIL relay 222 is configured to receive, via the master switch relay 216, the first voltage. The secondary power source relay 224 is configured to receive, via the master switch relay and, in particular the machine HVIL relay 222, the first voltage and allow a secondary power source, such as the secondary power source 132 of FIG. 1, to supply power to the mobile electric machine.

When the power source (RPU) is not engaged with the mobile electric machine and when any one of the emergency stop switches of the machine section 202 is in a stop state (indicating there is in an emergency and the machine should be immobilized), one of the normally closed contacts of the emergency stop switch will open and prevent the master switch relay 216 from receiving the first voltage, which, in turn, will prevent the machine HVIL relay 222 from supplying the first voltage to the secondary power source relay 224.

When the power source (RPU) is engaged with the mobile electric machine, the machine HVIL relay 222 is configured to receive, via the RPU HVIL relay 218, the first voltage when 1) the RPU emergency stop switch 220 is the run state, and 2) the one or more emergency stop switches 208 and 406 are in their corresponding run state. The machine HVIL relay 222 then supplies the first voltage to the secondary power source relay 224 to allow the secondary power source to supply power to the mobile electric machine.

By using this control scheme, the master switch relay 216 and the machine HVIL relay 222 allow the mobile electric machine, such the mobile electric machine 100 of FIG. 1, to continue to operate in a normal state, e.g., not immobilized, when the emergency stop switch(es) are each in a run state.

In some examples, the mobile electric machine can charge the RPU while it is engaged with the mobile electric machine. For example, when the power source (RPU) 105 is engaged with the mobile electric machine 100 of FIG. 1, when the one or more emergency stop switches of the machine section 202 are each in their corresponding run state, and when the RPU emergency stop switch 220 of the RPU section 204 is the run state, the RPU HVIL relay 218 is configured to receive a second voltage from a second voltage supply 226 and allow charging of at least one battery pack of the power source (RPU) 105. For example, the RPU HVIL relay 218 can be configured to receive 24 volts from a charger and supply that voltage to main pack contactors 228 that are electrically coupled with the battery pack 130 of the power source (RPU) 105 of FIG. 1, thereby allowing the battery pack 130 to be recharged while engaged to the mobile electric machine 100.

In some examples, the HVIL control system 200 includes at least one diode connected so as to prevent coupling between the first voltage supply and the second voltage supply. For example, the RPU section 204 includes one or more diodes 230 and/or one or more diodes 232 to prevent coupling the first voltage supply 214 and the second voltage supply 226.

INDUSTRIAL APPLICABILITY

The techniques described in this disclosure for battery swapping in electric machines have wide industrial applicability. Electric machines such as forklifts, airport tugs, mining trucks, and other heavy machinery often rely on large removable battery packs to provide power. When these battery packs run low, the entire machine must be taken out of service for an extended period to recharge. This leads to significant downtime and loss of productivity.

The proposed battery swapping control system allows quick hot-swapping of depleted battery packs with fully charged ones. Operators can simply drive the electric machine over to a battery changing station, detach the depleted pack, and attach a fresh pack. This takes only a few minutes compared to hours of recharging downtime. The machine can then immediately return to service. By redirecting the E-Stop and HVIL circuits before detachment, the sequence of relays and electronic controls enables smooth transition between battery packs, which allows the mobile electric machine to remain operational throughout the swap process.

In summary, the battery swapping techniques herein maximize uptime and productivity for electric industrial machines. Companies that utilize forklifts, mining trucks, airport tugs and other electric machinery will benefit greatly from the reduced downtime and flexibility of quick battery swaps. This technology has wide applicability across many industries that rely on electric drive vehicles. The safety improvements will also help prevent workplace accidents and machine failures during the swapping process.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A high-voltage interface lock (HVIL) control system for a mobile electric machine having a removable power unit (RPU), the HVIL control system comprising:
   at least one emergency stop switch having a run state and a stop state, the at least one emergency stop switch configured to be coupled with a first voltage from a first voltage supply;
   a master switch relay electrically coupled in series with the at least one emergency stop switch and configured to receive the first voltage when the at least one emergency stop switch is in the run state, the master switch relay configured to be electrically coupled with and provide the first voltage to an RPU HVIL relay when the RPU is engaged with the mobile electric machine;
   a machine HVIL relay electrically coupled with the master switch relay and with the RPU HVIL relay; and
   a secondary power source relay electrically coupled with the machine HVIL relay,
   wherein when the RPU is not engaged with the mobile electric machine and when the at least one emergency stop switch is in the run state:
      the machine HVIL relay is configured to:
         receive, via the master switch relay, the first voltage; and
      the secondary power source relay is configured to:
         receive, via the master switch relay, the first voltage and allow a secondary power source to supply power to the mobile electric machine.

2. The HVIL control system of claim 1, wherein when the RPU is engaged with the mobile electric machine:
   the machine HVIL relay is configured to:
      receive, via the RPU HVIL relay, the first voltage when 1) an RPU emergency stop switch having a run state and a stop state is the run state, and 2) the at least one emergency stop switch is in the run state; and
      supply the first voltage to the secondary power source relay to allow the secondary power source to supply power to the mobile electric machine.

3. The HVIL control system of claim 1, wherein the at least one emergency stop switch includes a cab emergency stop switch.

4. The HVIL control system of claim 1, wherein the at least one emergency stop switch includes at least two emergency stop switches.

5. The HVIL control system of claim 1, wherein when the RPU is engaged, and when the at least one emergency stop switch is in the run state, and when an RPU emergency stop switch of the RPU having a run state and a stop state is the run state:
   the RPU HVIL relay is configured to receive a second voltage from a second voltage supply and allow charging of at least one battery pack of the RPU.

6. The HVIL control system of claim 5, comprising:
   at least one diode connected so as to prevent coupling between the first voltage supply and the second voltage supply.

7. The HVIL control system of claim 1, further comprising:
   a first relay electrically coupled in series with the at least one emergency stop switch;
   a master electronic control module in electrical communication with the first relay, the master electronic control module including a controller;
   a first interface electronic control module in electrical communication with the master electronic control module; and
   a second relay in electrical communication with first interface electronic control module and the first relay,
   wherein the controller of the master electronic control module is configured to:
      monitor the run state and the stop state of the at least one emergency stop switch;
      monitor a battery swap switch; and
      when the at least one emergency stop switch is in the run state and when the battery swap switch is engaged:
         output a signal to the first interface electronic control module to energize the second relay to allow a secondary power source to supply power to the mobile electric machine.

8. The HVIL control system of claim 7, wherein when the RPU is engaged with the mobile electric machine:
   the master electronic control module is configured to be in electrical communication with a second interface electronic control module of the RPU, wherein the second interface electronic control module is configured to:
   output a first signal to the first interface electronic control module so as to cause the first interface electronic control module to output a signal to de-energize the second relay and place the mobile electric machine in a normal state.

9. The HVIL control system of claim 8, wherein the second interface electronic control module is further configured to:
  output a second signal to energize a third relay of the RPU.

10. A high-voltage interface lock (HVIL) control system for a mobile electric machine having a removable power unit (RPU), the HVIL control system comprising:
  at least one emergency stop switch having a run state and a stop state;
  a first relay electrically coupled in series with the at least one emergency stop switch;
  a master electronic control module in electrical communication with the first relay, the master electronic control module including a controller;
  a first interface electronic control module in electrical communication with the master electronic control module; and
  a second relay in electrical communication with first interface electronic control module and the first relay,
  wherein the controller of the master electronic control module is configured to:
    monitor the run state and the stop state of the at least one emergency stop switch;
    monitor a battery swap switch; and
    when the at least one emergency stop switch is in the run state and when the battery swap switch is engaged:
      output a signal to the first interface electronic control module to energize the second relay to allow a secondary power source to supply power to the mobile electric machine.

11. The HVIL control system of claim 10, wherein when the RPU is engaged with the mobile electric machine:
  the master electronic control module is configured to be in electrical communication with a second interface electronic control module of the RPU, wherein the second interface electronic control module is configured to:
  output a first signal to the first interface electronic control module so as to cause the first interface electronic control module to output a signal to de-energize the second relay and place the mobile electric machine in a normal state.

12. The HVIL control system of claim 11, wherein the second interface electronic control module is further configured to:
  output a second signal to energize a third relay of the RPU.

13. The HVIL control system of claim 10, wherein the first interface electronic control module and the master electronic control module are in electrical communication over a controller area network (CAN) bus.

14. The HVIL control system of claim 10, further comprising:
  a master switch relay electrically coupled in series with the at least one emergency stop switch and configured to receive a first voltage when the at least one emergency stop switch is in the run state, the master switch relay configured to be electrically coupled with and provide the first voltage to an RPU HVIL relay when the RPU is engaged with the mobile electric machine;
  a machine HVIL relay electrically coupled with the master switch relay and with the RPU HVIL relay; and
  a secondary power source relay electrically coupled with the machine HVIL relay,
  wherein when the RPU is not engaged with the mobile electric machine and when the at least one emergency stop switch is in the run state:
    the machine HVIL relay is configured to:
      receive, via the master switch relay, the first voltage; and
    the secondary power source relay is configured to:
      receive, via the master switch relay, the first voltage and allow a secondary power source to supply power to the mobile electric machine.

15. The HVIL control system of claim 14, wherein when the RPU is engaged with the mobile electric machine:
  the machine HVIL relay is configured to:
    receive, via the RPU HVIL relay, the first voltage when 1) an RPU emergency stop switch having a run state and a stop state is the run state, and 2) the at least one emergency stop switch is in the run state; and
  supply the first voltage to the secondary power source relay to allow the secondary power source to supply power to the mobile electric machine.

* * * * *